(12) United States Patent
Kakuho et al.

(10) Patent No.: US 7,610,896 B2
(45) Date of Patent: Nov. 3, 2009

(54) CONTROL DEVICE FOR INTERNAL COMBUSTION ENGINE

(75) Inventors: Akihiko Kakuho, Kanagawa (JP); Atsushi Teraji, Kanagawa (JP); Toru Noda, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 56 days.

(21) Appl. No.: 12/044,475

(22) Filed: Mar. 7, 2008

(65) Prior Publication Data
US 2008/0221778 A1    Sep. 11, 2008

(30) Foreign Application Priority Data
Mar. 9, 2007    (JP) ............... 2007-060586

(51) Int. Cl.
*F02M 43/00* (2006.01)
(52) U.S. Cl. ............ 123/304; 123/436; 123/3; 123/198 A
(58) Field of Classification Search ................. 123/1 A, 123/2–3, 436, 304, 198 A, 431
See application file for complete search history.

(56) References Cited

U.S. PATENT DOCUMENTS

| | | | |
|---|---|---|---|
| 6,318,306 B1 * | 11/2001 | Komatsu .................... | 123/3 |
| 6,739,289 B2 * | 5/2004 | Hiltner et al. ................. | 123/3 |
| 6,827,047 B2 * | 12/2004 | Qian et al. ................... | 123/3 |
| 6,935,284 B2 * | 8/2005 | Qian et al. ................... | 123/3 |
| 7,007,669 B1 | 3/2006 | Willi et al. | |
| 7,165,512 B2 * | 1/2007 | Hashimoto et al. ............ | 123/3 |
| 7,263,967 B2 | 9/2007 | Hotta et al. | |
| 2002/0139111 A1 | 10/2002 | Ueda et al. | |
| 2005/0028791 A1 | 2/2005 | Niimi | |
| 2007/0204813 A1 * | 9/2007 | Arai et al. ................. | 123/25 A |

FOREIGN PATENT DOCUMENTS

| | | |
|---|---|---|
| EP | 1 057 988 | 12/2000 |
| JP | 2000-110595 | 4/2000 |
| JP | 2000-329013 | 11/2000 |
| JP | 2002-38981 | 2/2002 |
| JP | 2005-2914 | 1/2005 |
| JP | 2005-139945 | 6/2005 |
| JP | 2006-342772 | 12/2006 |
| JP | 2008-31948 | 2/2008 |
| JP | 2008-45530 | 2/2008 |
| WO | WO 2004/111416 | 12/2004 |

* cited by examiner

*Primary Examiner*—Hai H Huynh
(74) *Attorney, Agent, or Firm*—Drinker Biddle & Reath LLP (57) ABSTRACT

An internal combustion engine system, including a primary fuel tank that stores a fuel, a fuel reformer that reforms the fuel from the primary fuel tank, a secondary fuel tank that stores the fuel reformed by the fuel reformer, a fuel injection device that injects the fuel that is selectably supplied from either the primary fuel tank or secondary fuel tank into a combustion chamber, a sensor that detects the quantity of fuel remaining in the secondary fuel tank, and a control device that sets and outputs a load and revolution speed of the engine. The control device is configured to set the engine load and engine revolution speed according to a request output determined based upon an operation performed by an operator. The engine load and engine revolution speed when the quantity of fuel remaining in the secondary fuel tank is more than a predetermined value, are set different than when the quantity of fuel remaining in the secondary fuel tank is less than the predetermined value.

15 Claims, 11 Drawing Sheets

CONTROL DEVICE FOR INTERNAL COMBUSTION ENGINE

CROSS-REFERENCE TO RELATED APPLICATIONS

This application claims priority to Japanese Patent Application No. 2007-60586, filed Mar. 9, 2007, which is incorporated by reference herein in the entirety.

BACKGROUND OF THE INVENTION

1. Field of the Invention

The present invention relates to a control device for an internal combustion engine that has a fuel reformer.

2. Description of Related Art

A low octane fuel is highly ignitable and, therefore, appropriate for running an engine under conditions for lean burning or for igniting a compressed homogenous fuel mixture, both of which are effective in improving fuel economy. However, the low octane fuel is more likely to cause knocking during high load running and, accordingly, is not appropriate for high load running. In contrast to the low octane fuel, a high octane fuel is less likely to cause knocking and, therefore, appropriate for high load running. However, the high octane fuel is not highly ignitable and is not appropriate either for running the engine under conditions for lean burning or the like. A vehicle that can use fuels of different octane ratings depending on an operating range may have both improved engine output and greater fuel economy. In view of these advantages, a technology has been proposed in which a fuel externally supplied to a vehicle is reformed to a fuel that has a different octane rating, and the fuel with a desired octane rating that matches running conditions of the engine is supplied to the engine.

However, such a conventional technology does not take account of the quantity of remaining reformed fuel. For example, if there is insufficient low octane fuel, a high octane fuel must be added to offset the insufficiency. This increases the octane rating and degrades ignitability in low load burning conditions, with the result that the engine is more likely to produce unstable burning. On the other hand, if there is insufficient high octane fuel, a low octane fuel must be added to offset the insufficiency. This decreases the octane rating and makes the engine more likely to fail during high load burning conditions due to knocking.

BRIEF SUMMARY OF THE INVENTION

The present invention has been made in view of the drawbacks discussed above. It is accordingly an object of the present invention to provide a control device for an internal combustion engine, which prevents the degradation of engine running performance even if the octane rating of a fuel supplied to the engine varies widely.

In an embodiment, the engine provides an internal combustion engine system, including a primary fuel tank that stores a fuel, a fuel reformer that reforms the fuel from the primary fuel tank, a secondary fuel tank that stores the fuel reformed by the fuel reformer, a fuel injection device that injects the fuel selectably supplied from either the primary fuel tank or secondary fuel tank into a combustion chamber, a sensor that detects the quantity of fuel remaining in the secondary fuel tank, and a control device that sets and outputs a load and revolution speed of the engine. The control device is configured to set the engine load and engine revolution speed according to a request output determined based upon an operation performed by an operator. The engine load and engine revolution speed when the quantity of fuel remaining in the secondary fuel tank is more than a predetermined value, are set different than when the quantity of fuel remaining in the secondary fuel tank is less than the predetermined value.

In another embodiment, the engine provides a method of setting an internal combustion engine load and revolution speed, including storing a fuel in a primary fuel tank, reforming the fuel from the primary fuel tank, storing the reformed fuel in a secondary fuel tank, injecting the fuel selected from the primary fuel tank or secondary fuel tank into a combustion chamber, detecting the quantity of fuel remaining in the secondary fuel tank, and setting and outputting the engine load and revolution speed according to a request output determined based upon an operation performed by an operator. The engine load and revolution speed are set different when the quantity of fuel remaining in the secondary fuel tank is more than a predetermined value, as compared to when the quantity of fuel remaining in the secondary fuel tank is less than the predetermined value.

The present invention makes it possible to set an engine load and engine revolution speed according to the quantity of remaining fuel (secondary fuel) reformed by a fuel reformer. In response to an insufficient quantity of remaining secondary fuel, the fuel to be used is switched. Even if the octane rating of the fuel supplied to the engine varies, the fuel reformer produces a suitable secondary fuel to replenish a secondary fuel tank. In addition, while satisfying a request output, the engine can run stably without knocking, misfires, etc.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Figure 1:
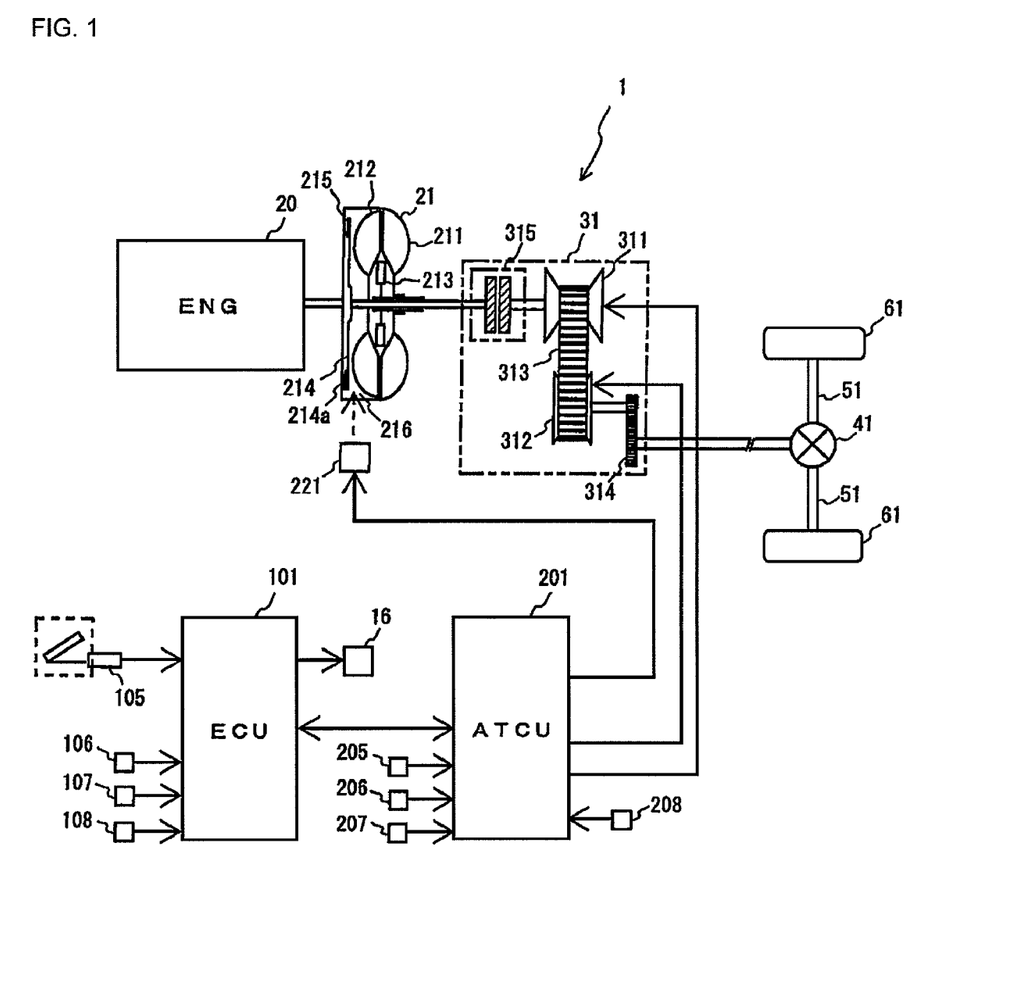
FIG. 1 is a diagram showing a power transmission device according to a first embodiment of the invention.

FIG. 1 shows a power transmission device 1, from an engine to drive wheels, according to a first embodiment of the invention.

The power transmission device 1 includes an internal combustion engine (hereafter "engine") 20 for use as a drive source, the crankshaft of which is connected to a belt drive type non-stage transmission 31 via a torque converter 21.

The torque converter 21 is provided for use as a starting element, and includes a pump impeller 211, a turbine runner 212, a stator 213, and a lockup clutch 214. The lockup clutch 214 is connected to the turbine runner 212, and mechanically directly connects the crankshaft of the engine 20 and the input shaft of the non-stage transmission 31 by pressing a clutch facing 214a against the internal face of a clutch housing 215, which is formed integrally with the pump impeller 211.

The non-stage transmission 31 includes an input pulley 311 and an output pulley 312, as well as a V-shaped metal belt 313 wound around the pulleys 311 and 312. A gear change ratio ip of the non-stage transmission 31 can be changed by making an input pulley ratio different from an output pulley ratio (i.e., making a ratio of the effective diameter of the input pulley 311 different from the effective diameter of output pulley 312). The non-stage transmission 31 further includes a final gear 314, which reduces a drive force, as a final stage after the gear change made by the pulleys 311 and 312. In addition, the non-stage transmission 31 has a forward clutch 315 for use as a multiple disc clutch, which switches the range to neutral or drive and disconnects the output shaft of the torque converter 21 and the input shaft (i.e., the rotating shaft of the input pulley 311) of the non-stage transmission 31. With the forward clutch 315 released, the transmission of the drive force of the engine 20 to the non-stage transmission 31 is stopped, thereby setting the transmission 31 to the neutral range.

In the power transmission device 1 having the foregoing configuration, the drive force generated by the engine 20 is transmitted to the non-stage transmission 31 via the torque converter 21, then converted into a predetermined gear change ratio ip by the transmission 31, and transmitted to left and right drive wheels 61 via a differential gear 41 and drive shafts 51.

Based on command signals from an AT control unit 201, hydraulic control valves provided for corresponding devices operate the non-stage transmission 31 (such as changing the pulley ratio) and engage or disengage the lockup clutch 214.

The AT control unit 201 inputs signals supplied from, for example: a vehicle sensor 205 that detects a vehicle speed (VSP); an inhibiter switch 206; an oil temperature sensor 207 that detects the temperature of a transmission hydraulic fluid (TF); and a revolution number sensor 208 that detects the number of revolutions of the turbine runner 212 (hereinafter referred to as "the number of turbine revolutions") (NT) for use as the input number of revolutions for the non-stage transmission 31. The AT control unit 201 also inputs the degree of opening of the accelerator (APO) and the number of revolutions of the engine (NE), which are supplied from an engine control unit 101. Based upon the input degree of opening of the accelerator (APO) and input vehicle speed (VSP), the AT control unit 201 performs predetermined operations related to transmission control, etc., and outputs command signals to the hydraulic control valves provided for the input pulley 311 and output pulley 312, as well as the hydraulic control valve provided for the lockup clutch 214 of the torque converter 21. In the first embodiment, by driving the movable members of the input and output pulleys 311 and 312 by the corresponding control valves (not shown), the AT control unit 201 exerts transmission control so that the non-stage transmission 31 has a predetermined gear change ratio ip matching the running conditions of the vehicle.

The engine control unit (ECU) 101 controls the engine 20, and performs predetermined operations for engine control, etc. through input signals supplied from, for example, an accelerator sensor 105 that detects the degree of operation of the accelerator pedal (i.e., the degree of opening of the accelerator (APO)); a crank angle sensor 106 detecting a unit crank angle or reference crank angle (based upon which the number of revolutions of the engine (NE) can be calculated); and a water temperature sensor 107 that detects the temperature of engine cooling water (TW). In addition, there is provided an idle switch 108 that outputs an ON-signal when the opening of the accelerator is fully closed for a speed reduction fuel cut. The idle switch 108 outputs an ON-signal when the accelerator pedal has been completely returned to its original position. This idle switch is disposed together with a throttle sensor (not shown). A signal from the idle switch 108 is output to the engine control unit 101. Normally the engine control unit 101 supplies a fuel injection valve 16 with a fuel injection control signal set based upon the degree of opening of the accelerator (APO), the number of revolutions of the engine (NE), etc.

Figure 2:
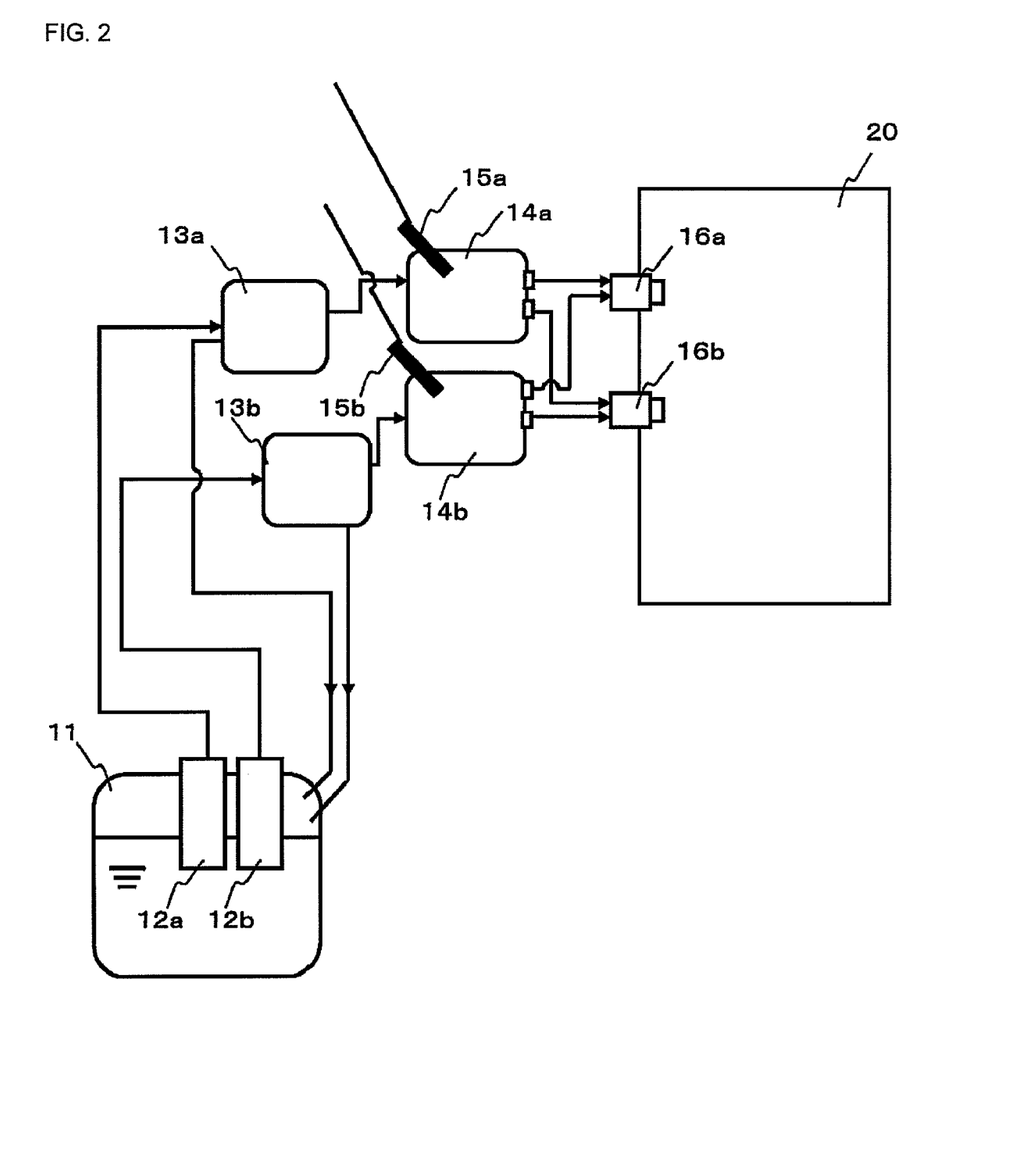
FIG. 2 is a diagram showing a system from a fuel tank to a fuel injection device according the first embodiment.

FIG. 2 is a diagram showing the configuration of a system from a fuel tank to a fuel injection device.

A primary fuel tank 11 stores a fuel fed from outside. This fuel is supplied to fuel reformers 13a, 13b by fuel pumps 12a, 12b, respectively.

Using exhaust heat and a reforming catalyst, the fuel reformer 13a reforms the fuel from the primary fuel tank 11 so as to increase the octane rating of this fuel. Using exhaust heat, the fuel reformer 13b reforms the fuel from the primary fuel tank 11 so as to decrease the octane rating of the fuel.

The high octane fuel (low auto-ignition fuel) obtained through reforming made by the fuel modifier 13a is stored in a secondary fuel tank 14a. The low octane fuel (high auto-ignition fuel) obtained through reforming made by the fuel modifier 13b is stored in a secondary fuel tank 14b. The secondary fuel tank 14a has a sensor 15a for detecting the quantity of remaining high octane fuel, and the secondary fuel tank 14b has a sensor 15b for detecting the quantity of remaining low octane fuel. The production process for the reformed fuels and their storage in the fuel tanks may be the same as those described in U.S. Pat. No. 7,263,967.

The fuel injection valve shown in FIG. 1 is composed of two fuel injection valves, 16a and 16b, disposed in an intake passage and a combustion chamber of the engine 20, so as to supply a fuel into the corresponding engine cylinder. Fuel injection valves 16a, 16b are disposed as such for each cylinder. The high and low octane fuels stored in the secondary fuel tanks 14a and 14b, respectively, are supplied to the fuel injection valves 16a and 16b by corresponding pressure pumps. Controlling the quantity of fuel supplied to each fuel injection value makes it possible to supply the high octane and low octane fuels to the engine 20 from the fuel injection valves 16a and 16b in required proportions.

The ratio of high to low octane fuel supplied to the fuel injection valves 16a and 16b is controlled by the ECU 101 in accordance with the operating conditions of the engine 20.

In addition to controlling the fuel supply proportion by use of fuel supply proportion control, the ECU 101 controls the quantity of fuel supplied.

Based upon an output requested by a driver, which is calculated by request output calculating device described below, and which is based upon the degree of opening of the accelerator, the ECU 101 is able to control an engine load (i.e., the quantity of fuel supplied per unit rotation of the engine) as necessary.

Since the output shaft of the engine 20 is connected to the non-stage transmission, the engine revolution speed can be controlled, as required, by controlling the gear change ratio of the non-stage transmission.

Figure 3:
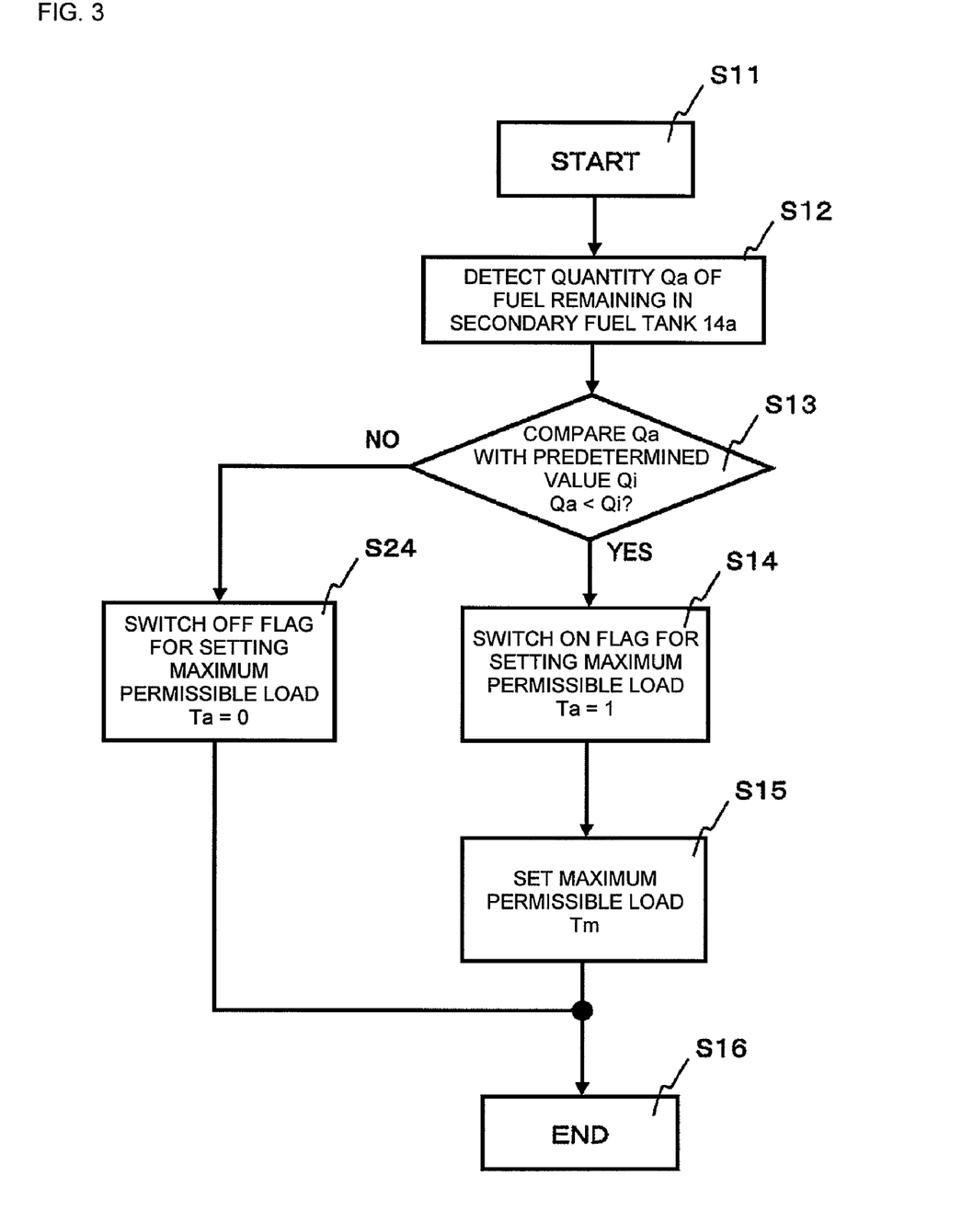
FIG. 3 is a flowchart illustrating the process of setting a maximum permissible load according to the first embodiment.

FIG. 3 is a flowchart illustrating the process of setting a maximum permissible load according to the first embodiment.

In step S12, using the sensor 15a, the ECU 101 detects a quantity Qa of fuel remaining in the secondary fuel tank 14a (i.e., fuel with an octane rating higher than the fuel stored in fuel tank 14b). In step S13, the ECU 101 then determines whether the detected quantity Qa of fuel is less than a predetermined value Qi. The predetermined value Qi is a threshold for determining whether a fuel used for the engine should be switched or not. If the quantity Qa of remaining fuel is less than the predetermined value Qi in step S13, only the low octane fuel is used or the proportion of low octane fuel to be supplied is increased regardless of the operating conditions of the engine 20. In step S14, on the other hand, a flag for setting the maximum permissible load is switched ON (Ta=1). Then, the maximum permissible load Tm is set in step 15. The maximum permissible load Tm, which is stored in the ECU 101 in advance, is a maximum value of load that does not affect the engine 20 performing knock-free operation, even in the absence of the high octane fuel. If the determination is made in step S13 that the quantity Qa of remaining fuel is equal to or more than the predetermined value Qi, the flag for setting the maximum permissible load is switched OFF (Ta=0) in step S24 and, therefore, the maximum permissible load Tm is not set.

Figure 4:
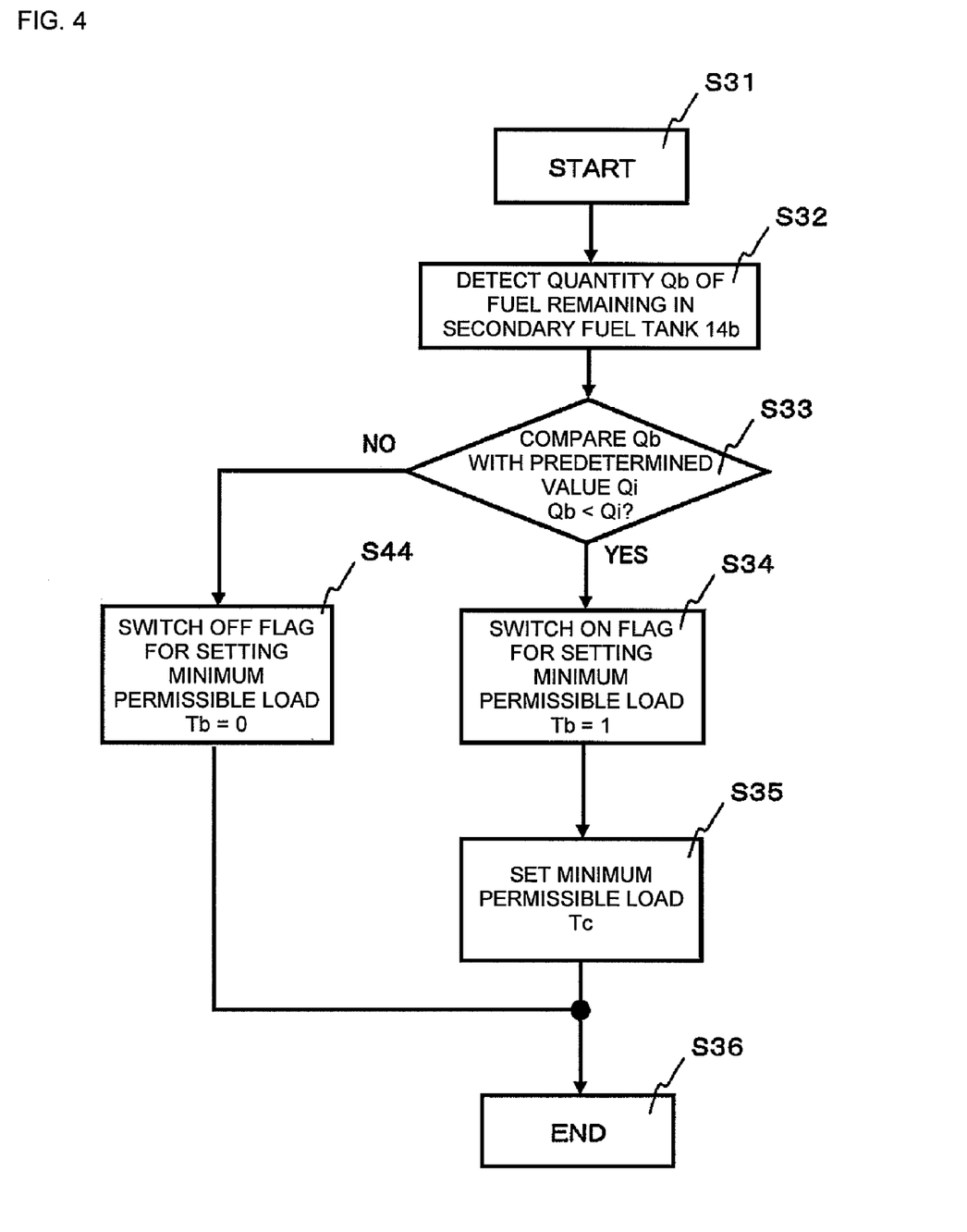
FIG. 4 is a flowchart illustrating the process of setting a minimum permissible load according to the first embodiment.

FIG. 4 is a flowchart illustrating the process of setting a minimum permissible load according to the first embodiment.

In step S32, using sensor 15b, the ECU 101 detects a quantity Qb of fuel remaining in the secondary fuel tank 14b (i.e., fuel with an octane rating lower than the fuel stored fuel tank 14a). In step S33, the ECU 101 then determines whether the detected quantity Qb of fuel is less than the predetermined value Qi. If the determination is made in step S33 that the quantity Qb of remaining fuel is less than the predetermined value Qi, only the high octane fuel is used, or the proportion of the high octane fuel to be supplied is increased, regardless of the operating conditions of the engine 20. In step S34, on the other hand, a flag for setting the minimum permissible load is switched ON (Tb=1). Then, the minimum permissible load Tc is set in step S35. The minimum permissible load Tc, which is stored in the ECU 101 in advance, is a minimum value of load that does not affect the engine 20 performing without misfires, even in the absence of the low octane fuel. If the determination is made in step S33 that the quantity Qb of remaining fuel is equal to or larger than the predetermined value Qi, the flag for setting the minimum permissible load is switched OFF (Tb=0) in step S44 and, therefore, the minimum permissible load Tc is not set.

Figure 5:
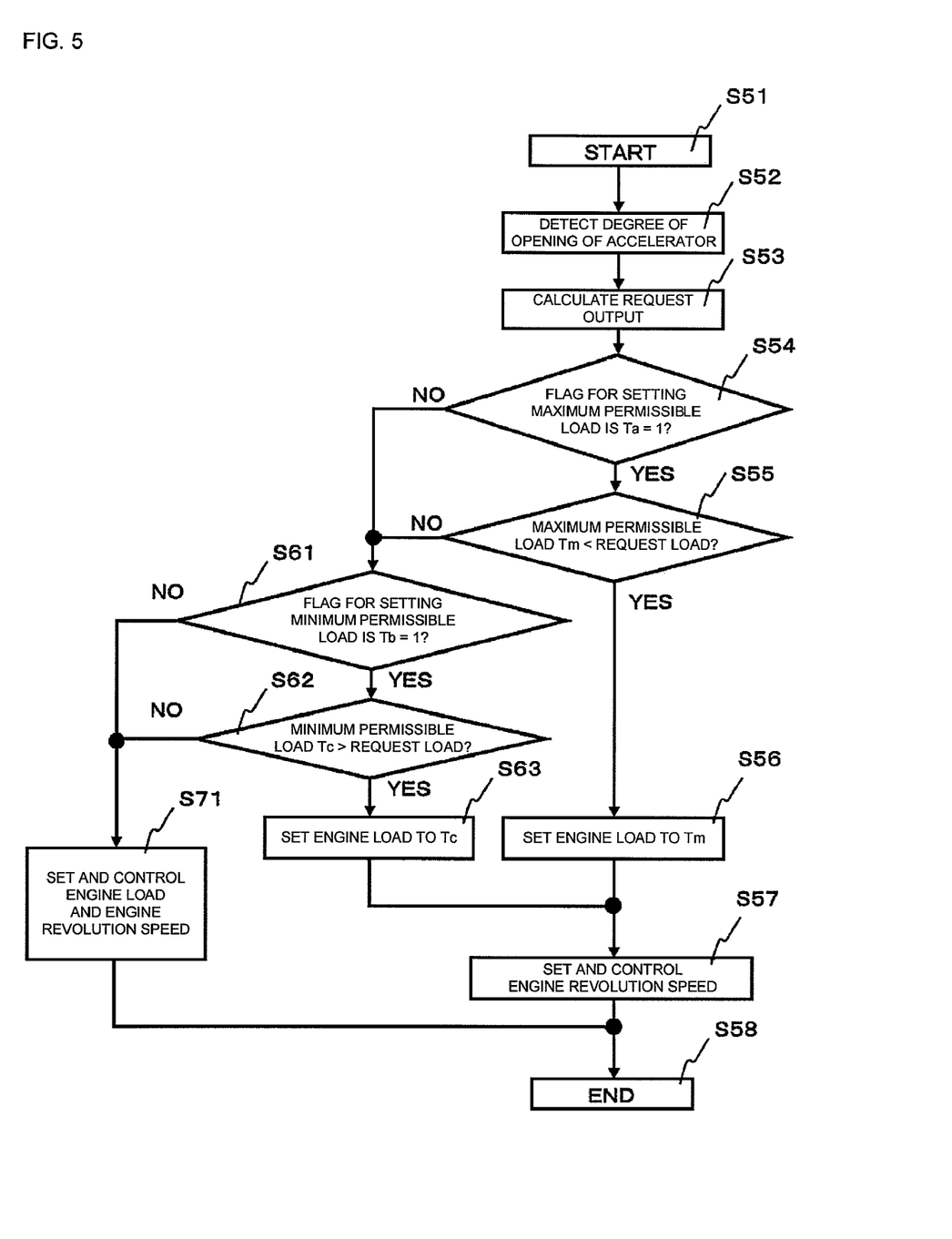
FIG. 5 is a flowchart illustrating engine load control and engine revolution speed control according to the first embodiment.

FIG. 5 is a flowchart illustrating engine load control and engine revolution speed control according to the present embodiment.

Figure 6:
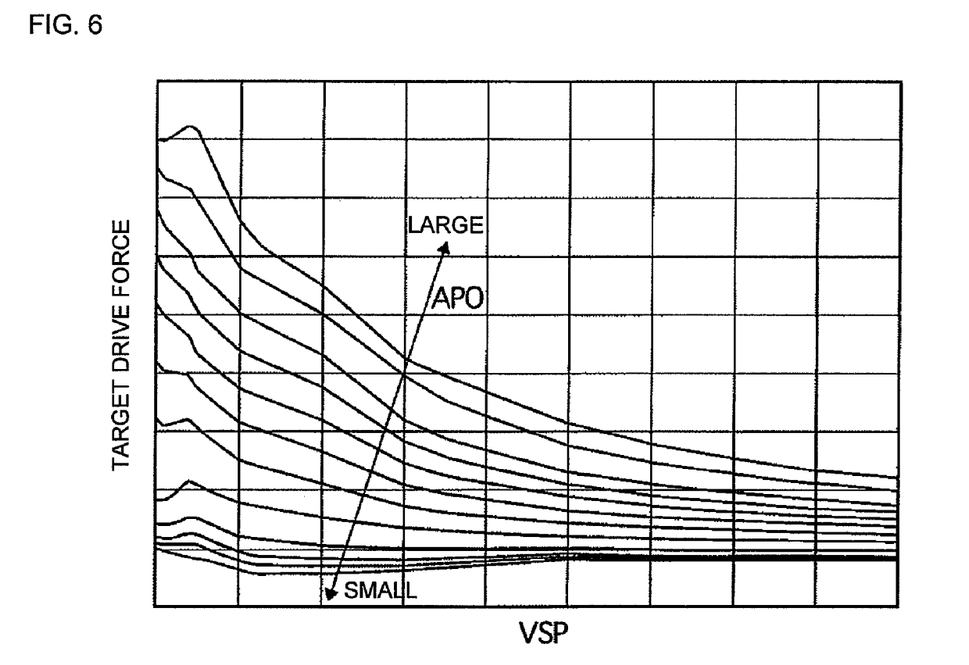
FIG. 6 is a map used for calculating a target drive force from a vehicle speed and the degree of opening of an accelerator (APO)

In step S52, using a sensor, the ECU 101 detects the degree of opening of the accelerator. Based upon this degree, the request output calculating device of the ECU 101 calculates a request output (and request load) in step S53. Using a map shown in FIG. 6, the request output calculating device calculates a target drive force for the vehicle from the degree of opening of the accelerator (APO) and the vehicle speed (VSP), and also calculates the request output and request load for the engine, taking account of fuel efficiency, etc. Subsequently, in step S54, the ECU 101 determines whether the flag for setting the maximum permissible load is ON (Ta=1) or not. If the flag for setting the maximum permissible load is ON (Ta=1) in step S54, the flow proceeds to step S55 where a determination is made whether the request load is greater than the maximum permissible load Tm or not. If the request load is greater than the maximum permissible load Tm in step S55, the flow proceeds to step S56 where the engine load is set to the maximum permissible load Tm, followed by step S57 where the engine revolution speed is set so as to satisfy the request output, and a gear change instruction is given to the non-stage transmission. The engine revolution speed can be calculated by an operation or from the output map. The AT control unit 201 that has received the gear change instruction sets the gear change ratio so that the engine revolves at the set speed.

If the flag for setting the maximum permissible load is not ON (Ta=1) (i.e., the flag for setting the maximum permissible load is OFF (Ta=0)) in step S54, or if the request load is equal to or lower than the maximum permissible load Tm in step S55, the flow proceeds to step S61 where a determination is made whether the flag for setting the minimum permissible load is ON (Tb=1) or not. If the flag is On (Tb=1) in step S61, the flow proceeds to step S62 where a determination is made whether the request load is smaller than the minimum permissible load Tc. If the request load is smaller than the minimum permissible load Tc in step S62, the flow proceeds to step S63 where the engine load is set to the minimum permissible load Tc, followed by step S57 where the engine revolution speed is set so as to satisfy the request output and gives a speed change instruction to the non-stage transmission. The AT control unit 201 that has received the speed change instruction sets the gear change ratio so that the engine revolves at the set speed.

If the flag for setting the minimum permissible load is not ON (Tb=1) in step S61 (i.e., if the flag for setting the minimum permissible load is OFF (Tb=0)), or the request load is equal to or greater than the minimum permissible load Tc in step S62, the flow proceeds to step S71 where the engine load is set to the request load, the engine revolution speed is set so as to satisfy the request output, and the engine revolution speed is controlled using the non-stage transmission.

Figure 7:
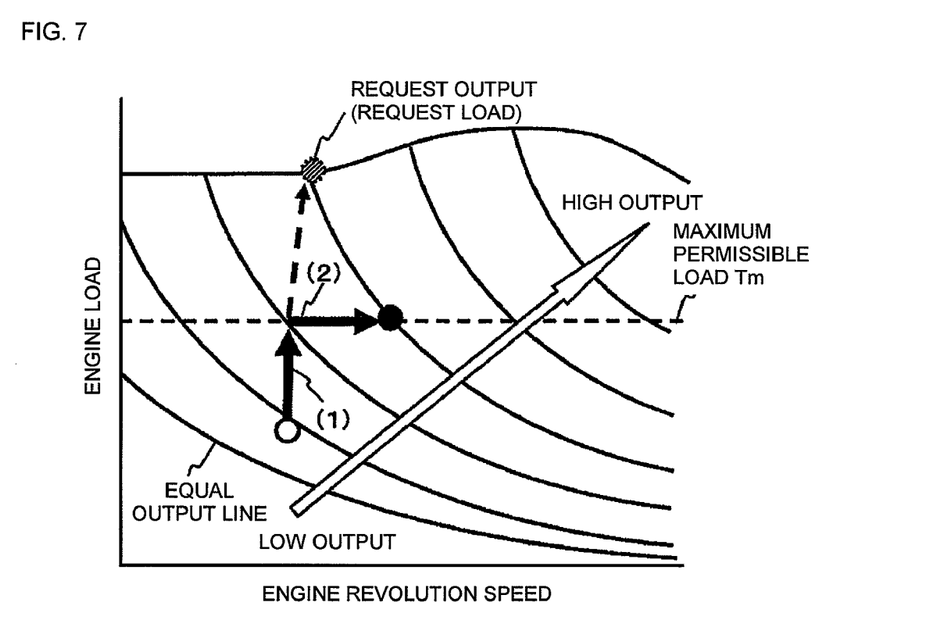
FIG. 7 is a diagram illustrating a method of controlling an engine load and engine revolution speed when a quantity of high octane fuel remaining in a secondary fuel tank is less than a predetermined value in accordance with the first embodiment.

Next will be described the load and engine revolution speed, where a quantity of high octane fuel in the secondary fuel tank of the first embodiment is less than the predetermined value (i.e., where the flag for setting the maximum permissible load is ON).

FIG. 7 shows changes in the engine load and engine revolution speed where the initial engine load (indicated by the empty circle in the diagram) reaches the request load (indicated by the hatched circle) on account of an increase in the degree of opening of the accelerator.

If the request load (indicated by the hatched circle) is greater than the maximum permissible load Tm, the engine load is first increased to the maximum permissible load Tm (indicated by the arrow (1)). Subsequently, in order to satisfy the request output, the engine revolution speed is increased and then the engine load and engine revolution speed are manipulated so as to fall on the equal output line including the request output and on the line representing the maximum permissible load Tm (indicated by the arrow (2) and solid circle) of the engine. Equal output lines as in the diagram indicate that the greater the engine load and engine revolution speed, the higher the output.

This makes it possible to prevent knocking even where the quantity Qb of high octane fuel remaining in the second fuel tank 14a becomes less than the predetermined value Qi, and the supply of high octane fuel is, therefore, limited or stopped, with the result that the engine is run using only the low octane fuel in the secondary fuel tank 14b.

Figure 8:
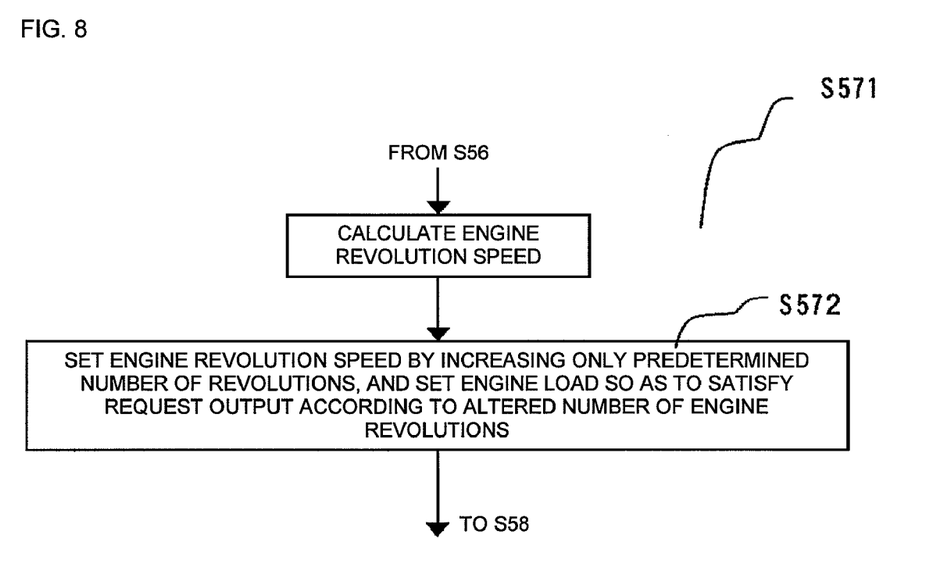
FIG. 8 is a flowchart illustrating an additional control according to the first embodiment.
Figure 9:
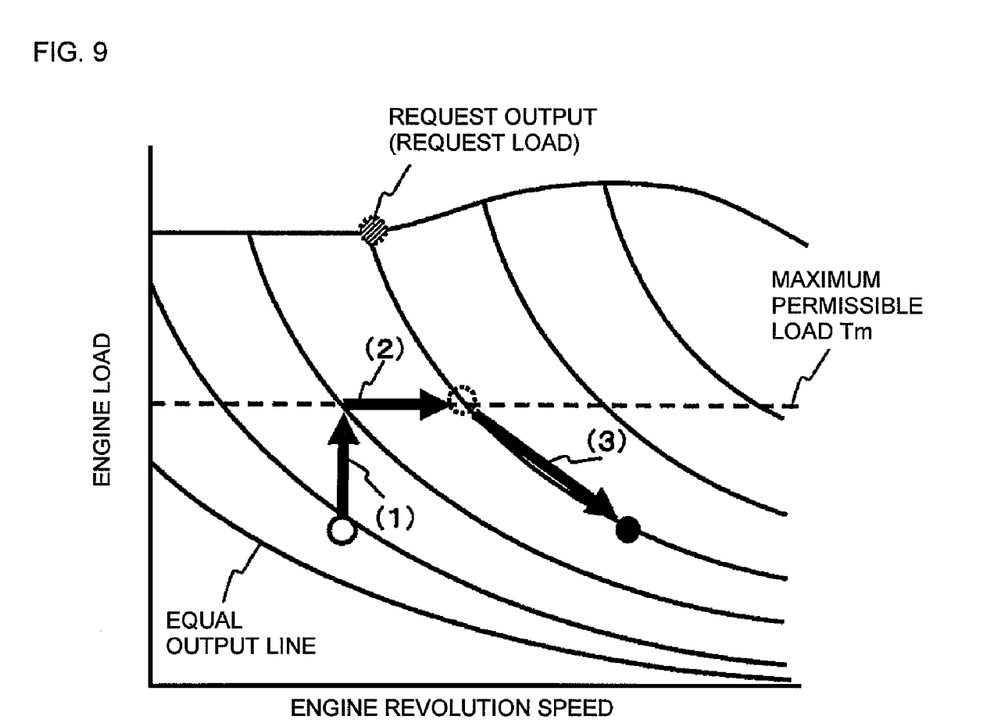
FIG. 9 is a diagram illustrating a method of controlling an engine load and engine revolution speed when a quantity of high octane fuel remaining in the secondary fuel tank is less than a predetermined value in accordance with the first embodiment.

As shown in FIG. 8, in the first embodiment, step S57 in the control flowchart in may be replaced by a step taking account of the addition of the high octane fuel. In this case, the engine revolution speed is first calculated in step S571 so as to satisfy the request output. Subsequently, in step S572, the revolution speed found in step S571 is set by increasing only a predetermined number of revolutions, and the engine load is also set so as to satisfy the request output according to the altered number of engine revolutions. Then, command values are output to the engine 20 and the non-stage transmission. The engine revolution speed is increased so as not to discomfort the driver or degrade fuel economy. This revolution speed is set in advance so as to match vehicle characteristics. FIG. 9 shows changes in the engine load and engine revolution speed which result from the additional supply of high octane fuel to the secondary fuel tank.

In order that the quantity of high octane fuel remaining in the secondary fuel tank be equal to or higher than the predetermined value at an early stage, the reforming speed of the fuel reformer is increased. In the first embodiment, the fuel reformer reforms the fuels by utilizing exhaust heat. Accordingly, increases in the exhaust flow rate and temperature increase the quantity of heat transferred to the fuel reformer, and hence the reforming speed. Specifically, along the equal output line including the request output, the engine load is decreased from a point (indicated by the dotted circle in FIG. 9) on the equal output line and the line representing the maximum permissible load Tm. Simultaneously the engine revolution speed is increased (as indicated by the arrow (3) and solid circle in FIG. 9), thereby increasing exhaust flow rate and temperature. Thus, the engine load and engine revolution speed are manipulated to increase the reforming speed. Alternatively, the engine load and engine revolution speed may be altered gradually so that only a predetermined number of engine revolutions is increased when the fuel remaining in the secondary fuel tank 14a has become less than a quantity Qh set slightly larger than the quantity Qi. In this control mechanism, until the quantity of remaining fuel increases from Qh to Qi, the maximum permissible load is not set, and only the number of engine revolutions is increased.

Figure 10:
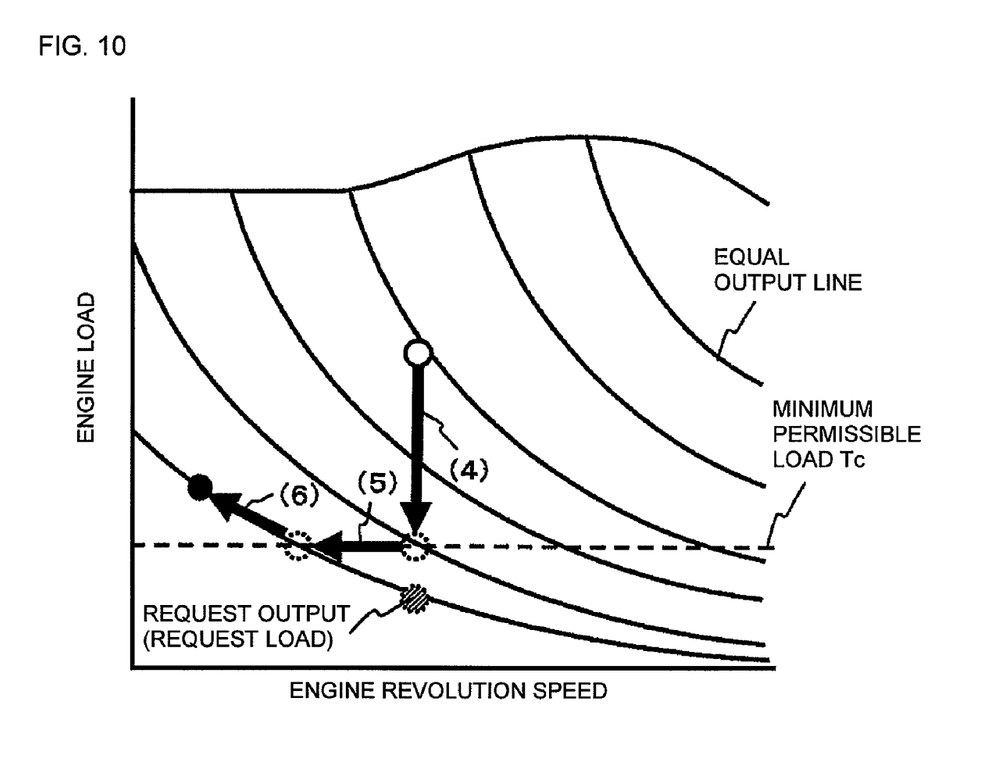
FIG. 10 is a diagram illustrating a method of controlling an engine load and engine revolution speed when a quantity of low octane fuel remaining in a secondary fuel tank is less than a predetermined value in accordance with the first embodiment.

FIG. 10 is a diagram showing changes in the engine load and engine revolution speed where a quantity of low octane fuel remaining in the secondary fuel tank according to the first embodiment is less than the predetermined value (i.e., the flag for setting the minimum permissible load is ON).

FIG. 10 illustrates a method of controlling the engine load and engine revolution speed where the initial engine load (indicated by the empty circle in the diagram) reaches the request load (indicated by the hatched circle) on account of a decease in the degree of opening of the accelerator.

Since the request load (indicated by the hatched circle in FIG. 10) is smaller than the minimum permissible load Tc, the engine load is decreased to the minimum permissible load Tc (indicated by the arrow (4)). Subsequently, in order to satisfy the request output, the engine revolution speed is decreased so as to fall on the equal output line including the request output and on the line representing the minimum permissible load Tc (indicated by the arrow (5)) of the engine. Thereafter, as well as increasing the engine load along the equal output line, the ECU 101 decreases the engine revolution speed (indicated by the allow (6) and the solid circle in FIG. 10). Thus, the engine load and engine revolution speed are controlled to prevent any degrading in the fuel economy of the engine.

In the first embodiment described above, a control derive for an internal combustion engine includes a device for detecting the quantity of fuel remaining in a secondary fuel tank (e.g., sensor 15 for the quantity of remaining fuel); a non-stage transmission capable of continuously adjusting an engine revolution speed; an engine load control device for controlling an engine load; and an engine revolution speed control device for controlling the engine revolution speed by use of the non-stage transmission. The control device controls the engine load and engine revolution speed based upon a request output and the quantity of fuel determined to be remaining in the secondary fuel tank. This makes it possible to set an engine load and engine revolution speed that match the quantity of fuel remaining in the secondary fuel tank. Thus, any degrading of running performance, resulting from an insufficient quantity of remaining reformed fuel (i.e., secondary fuel), can be prevented.

According to the first embodiment, if the quantity of fuel remaining in the secondary fuel tank detected by the sensor 15, is less than a predetermined value, the control device controls the engine load and engine revolution speed so as to boost the reforming speed. Accordingly, the engine load and engine revolution speed can be set so as to replenish the reformed fuel speedily. This minimizes incidences of insufficient quantity of the reformed fuel (i.e., secondary fuel), thus ensuring speedy return to pre-set optimum conditions (e.g., engine load and engine revolution speed) for the internal combustion engine 20.

Additionally, in the first embodiment, the fuel reformer 13a reforms a fuel to high octane type and stores it in the secondary fuel tank 14a. If the quantity of high octane fuel remaining in the secondary fuel tank is less than the predetermined value, the control device sets a maximum value for the engine load operable without knocking, even given the absence of high octane fuel from the fuel supplied to the maximum permissible load (i.e., internal combustion engine 20). In addition, when a request output is increased, the control device sets the engine load to the maximum permissible load or below, and adjusts the engine revolution speed so as to satisfy the request output. This prevents such a situation as that when the fuel supplied to the internal combustion engine 20 is switched from high octane fuel to another fuel due to an insufficient quantity of high octane fuel, the engine load is possibly increased too high, resulting in knocking during the time taken for the remaining high octane fuel to recover to the predetermined level.

In the first embodiment, the fuel reformer 13b reforms a fuel to low octane type and stores it in the secondary fuel tank 14b. If the quantity of low octane fuel remaining in the secondary fuel tank is less than the predetermined value, the control device sets a minimum value for the engine load operable without misfires, even given the absence of low octane fuel from the fuel supplied to the minimum permissible load (i.e., internal combustion engine 20). Also, when the request output decreases, the control device sets the engine load to the minimum permissible load or greater, and adjusts the engine revolution speed to satisfy the request output. This prevents such a situation as that when a fuel supplied to the internal combustion engine 20 is switched from low octane fuel to another fuel due to an insufficient quantity of low octane fuel, the engine load is possibly decreased too low, resulting in misfires for the time taken for the remaining low octane fuel to recover to the predetermined level.

Figure 11:
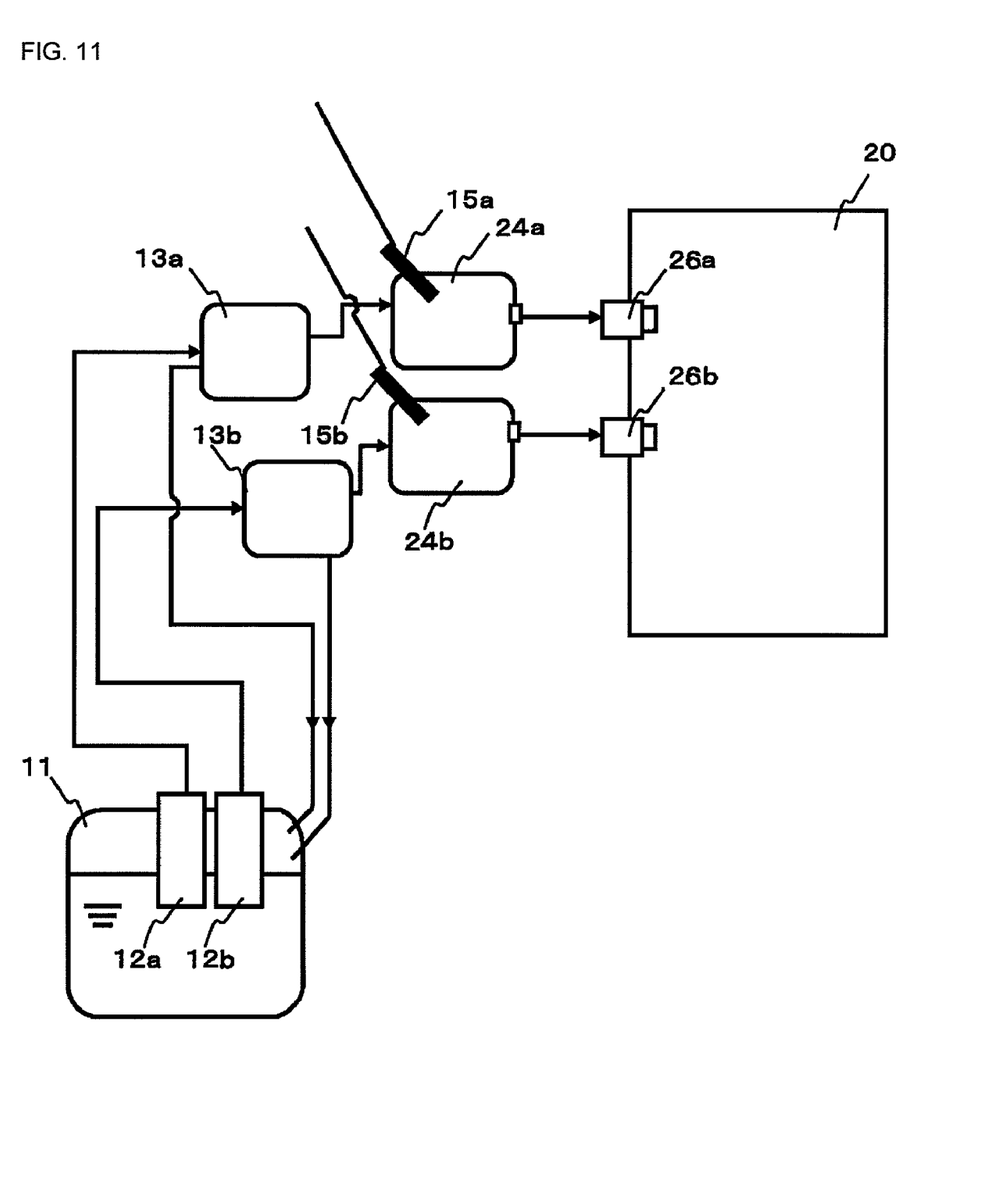
FIG. 11 is a diagram showing the configuration of a control device for an internal combustion engine according to a second embodiment.

Next, a modified example of the system will be described with reference to FIG. 11.

A description will be given of only the features different from those in the first embodiment shown in FIG. 2.

A high octane fuel is supplied from a secondary fuel tank 24a to the engine 20 via a fuel injection valve 26a, and a low octane fuel is supplied from a secondary fuel tank 24b to the engine 20 via a fuel injection valve 26b, such that the high and low octane fuels are not mixed together inside the fuel injection valves 26a and 26b.

According to the modified example, the high and low octane fuels are separately supplied to the internal combustion engine 20 by the corresponding fuel injection valves without being mixed. This makes it possible to adjust the octane rating of each fuel according to the quantity of each fuel injected by the corresponding fuel injection valve.

Figure 12:
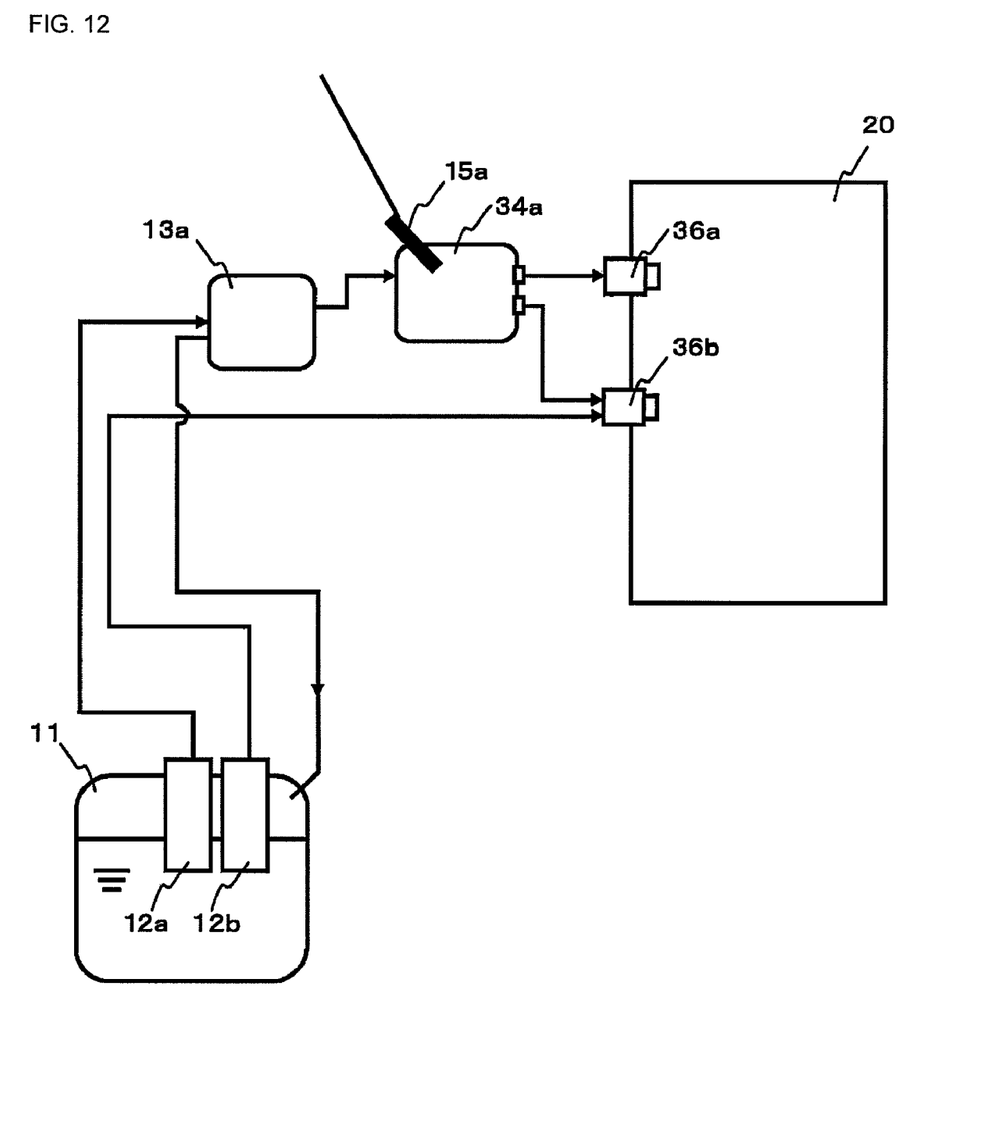
FIG. 12 is a diagram showing the configuration of a control device for an internal combustion engine according to a third embodiment.

Referring to FIG. 12, another modified example of the system will be described below.

A description will be given of only the features different from those in the first embodiment shown in FIG. 2.

This modified example includes only one fuel reformer, only one secondary fuel tank, and only one sensor for detecting a quantity of fuel remaining in the secondary fuel tank. Only the fuel stored in a secondary fuel tank 34a can be supplied to a fuel injection valve 36a whereas the fuel stored in the primary fuel tank 11 and the fuel stored in the secondary fuel tank 34a can simultaneously be supplied to a fuel injection valve 36b. For example, fuel injection valve 36b can inject a mixture of fuel comprising 20% from the primary fuel tank 11 and 80% from the secondary fuel tank 34a. Of course, any desired mixture could be selected from fuel tanks 11, 34a.

In this embodiment, the fuel reformer 13a reforms a fuel in the primary fuel tank 11 so as to increase the octane rating of the fuel, and the high octane fuel yielded by the reforming is stored in the secondary fuel tank 34a. This obviates the need for the steps (i.e., all the steps in FIG. 3 and steps S61 to S63 in FIG. 4) for engine load control using the minimum permissible load as described in the first embodiment.

In this embodiment, the fuel reformer 13a may reform a fuel so as to decrease its octane rating, and the low octane fuel yielded by the reforming may be stored in the secondary fuel tank 34a. This obviates the need for steps (i.e., all the steps in FIG. 2 and steps S54 to S56 in FIG. 4) for the engine load control that uses the maximum permissible load as described in the first embodiment.

According to this embodiment, the number of fuel reformers, secondary fuel tanks, and sensors for measuring the quantity of fuel remaining in the secondary fuel tank may equal one. Compared to the first embodiment, this reduces the installation space and simplifies the configuration of the control device for the engine.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. An internal combustion engine system, comprising:
    a primary fuel tank that stores a fuel;
    a fuel reformer that reforms the fuel from the primary fuel tank;
    a secondary fuel tank that stores the fuel reformed by the fuel reformer;
    a fuel injection device that injects the fuel that is selectably supplied from either the primary fuel tank or secondary fuel tank into a combustion chamber;
    a sensor that detects the quantity of fuel remaining in the secondary fuel tank; and
    a control device that sets and outputs a load and revolution speed of the engine, wherein
    the control device is configured to set the engine load and engine revolution speed according to a request output determined based upon an operation performed by an operator, and
    the engine load and engine revolution speed when the quantity of fuel remaining in the secondary fuel tank is more than a predetermined value, are set different than when the quantity of fuel remaining in the secondary fuel tank is less than the predetermined value.

2. The internal combustion engine system according to claim 1, wherein, when the quantity of fuel remaining in the secondary fuel tank is less than the predetermined value, the engine revolution speed is set higher to boost the reforming speed of the fuel reformer, as compared to when the quantity of fuel remaining in the secondary fuel tank is more than the predetermined value.

3. The internal combustion engine system according to claim 2, wherein the request output is calculated based on a degree of opening of an accelerator.

4. The internal combustion engine system according to claim 1, wherein
    the fuel reformer reforms the fuel to a high octane type as compared to the fuel stored in the primary fuel tank,
    if the sensor detects that the quantity of high octane fuel remaining in the secondary tank is less than the predetermined value, the control device sets a maximum permissible engine load, and
    if the engine load set by the control device exceeds the maximum permissible load, the engine load is adjusted to the maximum permissible load or below.

5. The internal combustion engine system according to claim 4, wherein the maximum permissible load is a maximum value for the engine load operable without knocking, even in the absence of the high octane fuel from the fuel supplied to the engine.

6. The internal combustion engine system according to claim 5, wherein the request output is calculated based on a degree of opening of an accelerator.

7. The internal combustion engine system according to claim 4, wherein the request output is calculated based on a degree of opening of an accelerator.

8. The internal combustion engine system according to claim 1, wherein
    the fuel reformer reforms the fuel to a low octane type as compared to the fuel stored in the primary fuel tank,
    if the sensor detects that the quantity of low octane fuel remaining in the secondary tank is less than the predetermined value, the control device sets a minimum permissible engine load, and if the engine load set by the control device is below the minimum permissible load, the engine load is adjusted to the minimum permissible load or more.

9. The internal combustion engine system according to claim 8, wherein the minimum permissible load is a minimum value for the engine load operable without misfires, even in the absence of the low octane fuel from the fuel supplied to the engine.

10. The internal combustion engine system according to claim 9, wherein the request output is calculated based on a degree of opening of an accelerator.

11. The internal combustion engine system according to claim 8, wherein the request output is calculated based on a degree of opening of an accelerator.

12. The internal combustion engine system according to claim 1, wherein the request output is calculated based on a degree of opening of an accelerator.

13. The internal combustion engine system according to claim 1, wherein the fuel injection device injects a mixture of fuel that is selectably supplied from the primary fuel tank and secondary fuel tank into the combustion chamber.

14. An internal combustion engine system, comprising:
a primary fuel tank that stores a fuel;
fuel reforming means for reforming the fuel from the primary fuel tank;
a secondary fuel tank that stores the fuel reformed by the fuel reforming means;
fuel injection means for injecting the fuel selected from the primary fuel tank or secondary fuel tank into a combustion chamber;
sensing means for detecting the quantity of fuel remaining in the secondary fuel tank; and
control means for setting and outputting a load and revolution speed of the engine, wherein
control means is configured to set the engine load and engine revolution speed according to a request output determined based upon an operation performed by an operator, and
the engine load and engine revolution speed when the quantity of fuel remaining in the secondary fuel tank is more than a predetermined value, are set different than when the quantity of fuel remaining in the secondary fuel tank is less than the predetermined value.

15. A method of setting an internal combustion engine load and revolution speed, comprising:
storing a fuel in a primary fuel tank;
reforming the fuel from the primary fuel tank;
storing the reformed fuel in a secondary fuel tank;
injecting the fuel selected from the primary fuel tank or secondary fuel tank into a combustion chamber;
detecting the quantity of fuel remaining in the secondary fuel tank; and
setting and outputting the engine load and revolution speed according to a request output determined based upon an operation performed by an operator,
wherein the engine load and revolution speed are set different when the quantity of fuel remaining in the secondary fuel tank is more than a predetermined value, as compared to when the quantity of fuel remaining in the secondary fuel tank is less than the predetermined value.

* * * * *